US010453244B2

(12) United States Patent
Hirota

(10) Patent No.: US 10,453,244 B2
(45) Date of Patent: Oct. 22, 2019

(54) MULTI-LAYER UV MAP BASED TEXTURE RENDERING FOR FREE-RUNNING FVV APPLICATIONS

(71) Applicant: Sony Corporation, Tokyo (JP)

(72) Inventor: Yoichi Hirota, San Jose, CA (US)

(73) Assignee: Sony Corporation, Tokyo (JP)

( * ) Notice: Subject to any disclaimer, the term of this patent is extended or adjusted under 35 U.S.C. 154(b) by 86 days.

(21) Appl. No.: 15/723,021

(22) Filed: Oct. 2, 2017

(65) Prior Publication Data

US 2018/0101978 A1  Apr. 12, 2018

Related U.S. Application Data

(60) Provisional application No. 62/405,696, filed on Oct. 7, 2016, provisional application No. 62/426,739, filed on Nov. 28, 2016.

(51) Int. Cl.
| | |
|---|---|
| *G06T 15/04* | (2011.01) |
| *H04N 13/282* | (2018.01) |
| *G06T 5/00* | (2006.01) |
| *G06T 15/20* | (2011.01) |
| *H04N 13/111* | (2018.01) |
| *H04N 13/117* | (2018.01) |

(52) U.S. Cl.
CPC ............ *G06T 15/04* (2013.01); *G06T 5/005* (2013.01); *G06T 15/205* (2013.01); *H04N 13/111* (2018.05); *H04N 13/117* (2018.05); *H04N 13/282* (2018.05); *G06T 2207/10021* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 6,266,068 B1 | 7/2001 | Kang et al. | |
| 2012/0120054 A1 | 5/2012 | Samdrew et al. | |
| 2012/0242790 A1* | 9/2012 | Sandrew | H04N 13/257 |
| | | | 348/43 |

FOREIGN PATENT DOCUMENTS

| | | |
|---|---|---|
| CN | 104575501 A | 4/2015 |
| GB | 2532003 A | 5/2016 |

OTHER PUBLICATIONS

Oh, K., Yea, S., Ho, Y., Hole-Filling Method Using Depth Based In-Painting for View Synthesis in Free Viewpoint Television (FTV) and 3D Video, Jun. 2009, Mitsubishi Electric Research Laboratories, pp. 1-6. (Year: 2009).*

Anh Tu Tran et al., "Depth Based View Synthesis Using Graph Cuts for 3DTV", Journal of Signal and Information Processing, 2013, 4 pp. 327-335, http://dx.doi.org/10.4236/jsip.2013.43041, Published Online Aug. 2013 (http://www.script.org/journal/jsip).

(Continued)

*Primary Examiner* — Said Broome

(74) *Attorney, Agent, or Firm* — Haverstock & Owens LLP

(57) ABSTRACT

A scalable texture data representation which enables spatio-temporal texture synthesis for occlusion by using a temporally consistent texture UV map, view-dependent texture mapping for seamless/specular color by using an additional multi-layer texture UV map, and view-dependent texture alignment for natural mapping by using an extra flow UV map, is described herein.

21 Claims, 8 Drawing Sheets

(56) References Cited

OTHER PUBLICATIONS

Marcho Volino et al., "Layered view-dependent texture maps", Visual Media Production, ACM, 2 Penn Plaza, Suite 701, New York, NY 10121-0701, USA, Nov. 6, 2013 (Nov. 6, 2013), pp. 1-8, XP058044103, DOI: 10.1145/2534008.2534022, ISBN: 978-1-4503-2589-9, abstract sections 2.2, 3.

James Imber et al., "Free-viewpoint video rendering tor mobile devices.", Conference: Proceedings of the 6th International Conference on Computer Vision/Computer Graphics Collaboration Techniques and Applications, Jun. 2013 (Jun. 2013), Conference Paper XP002776398, DOI: 10.1145/24466715.2466726, URL: https://www.researchgate.net/publication/261845133_Free_viewpoint_video_rendering_for_mobile_devices, pp. 1-9.

International Search Report dated Dec. 19, 2017, from International Application No. PCT/US2017/054985.

* cited by examiner

MULTI-LAYER UV MAP BASED TEXTURE RENDERING FOR FREE-RUNNING FVV APPLICATIONS

CROSS-REFERENCE TO RELATED APPLICATION(S)

This application claims priority under 35 U.S.C. § 119(e) of the U.S. Provisional Patent Application Ser. No. 62/405,696, filed Oct. 7, 2016 and titled, "MULTI-LAYER UV MAP BASED TEXTURE RENDERING FOR FREE-RUNNING FVV APPLICATIONS," and of the U.S. Provisional Patent Application Ser. No. 62/426,739, filed Nov. 28, 2016 and titled, "MULTI-LAYER UV MAP BASED TEXTURE RENDERING FOR FREE-RUNNING FVV APPLICATIONS," which are both hereby incorporated by reference in their entirety for all purposes.

FIELD OF THE INVENTION

The present invention relates to three dimensional graphics. More specifically, the present invention relates to sparse view multi-view three dimensional graphics.

BACKGROUND OF THE INVENTION

Free Viewpoint Video (FVV) is video which allows a user to change the viewpoint of the video at any time. For example, a user watching a sports video could change from watching the sports video from a perspective behind home plate to a perspective from the outfield. This enables users/viewers to view the content from a unique perspective.

Previous attempts of texture synthesis have utilized a single-layer texture UV map, but then texture seams or low contrast colors are observed by merging texture from different cameras. Other attempts of texture synthesis align textures from different cameras globally on the surface, and unnaturally scaled texture is easily observed.

SUMMARY OF THE INVENTION

A scalable texture data representation which enables spatio-temporal texture synthesis for occlusion by using a temporally consistent texture UV map, view-dependent texture mapping for seamless/specular color by using an additional multi-layer texture UV map, and view-dependent texture alignment for natural mapping by using an extra flow UV map, is described herein.

In one aspect, a method programmed in a memory of a device to render a texture on an object in a free viewpoint video content comprises implementing inpainting in a UV map domain, utilizing a multi-layer texture UV map to combine texture segments and using a flow UV map to apply texture to a shape to prevent an incorrect shape, wherein implementing inpainting, utilizing the multi-layer texture UV map and using the flow UV map produce a temporally consistent texture for the object. Implementing inpainting in the UV map domain includes filling in any occluded aspects of the texture for the object using the texture captured at a different time. Utilizing the multi-layer texture UV map includes employing a weighted sum to combine the texture segments. Using the flow UV map includes generating and storing global alignment information of the texture. Implementing inpainting, utilizing the multi-layer texture UV map and using the flow UV map are included in processing the free viewpoint video content which further includes geometry processing. The method further comprises transmitting, rendering and displaying the free viewpoint video content including the object with temporally consistent texture. The method further comprises acquiring the free viewpoint video content using at most 10 video cameras. The method further comprises acquiring the free viewpoint video content using video cameras with at least 30 degrees of separation on every axis from other cameras.

In another aspect, an apparatus comprises a non-transitory memory for storing an application, the application for: implementing inpainting in a UV map domain, utilizing a multi-layer texture UV map to combine texture segments and using a flow UV map to apply texture to a shape to prevent an incorrect shape, wherein implementing inpainting, utilizing the multi-layer texture UV map and using the flow UV map produce a temporally consistent texture for the object and a processor coupled to the memory, the processor configured for processing the application. Implementing inpainting in the UV map domain includes filling in any occluded aspects of the texture for the object using the texture captured at a different time. Utilizing the multi-layer texture UV map includes employing a weighted sum to combine the texture segments. Using the flow UV map includes generating and storing global alignment information of the texture. Implementing inpainting, utilizing the multi-layer texture UV map and using the flow UV map are included in processing the free viewpoint video content which further includes geometry processing. The apparatus further comprises transmitting, rendering and displaying the free viewpoint video content including the object with temporally consistent texture. The apparatus further comprises acquiring the free viewpoint video content using at most 10 video cameras. The apparatus further comprises acquiring the free viewpoint video content using video cameras with at least 30 degrees of separation on every axis from other cameras.

In another aspect, a system comprises a plurality of camera devices each configured for capturing free viewpoint video content, a first computing device configured for: implementing inpainting in a UV map domain, utilizing a multi-layer texture UV map to combine texture segments and using a flow UV map to apply texture to a shape to prevent an incorrect shape, wherein implementing inpainting, utilizing the multi-layer texture UV map and using the flow UV map produce a temporally consistent texture for the object in the free viewpoint video content and a second computing device configured for: displaying the free viewpoint video content on the second computing device. Implementing inpainting in the UV map domain includes filling in any occluded aspects of the texture for the object using the texture captured at a different time. Utilizing the multi-layer texture UV map includes employing a weighted sum to combine the texture segments. Using the flow UV map includes generating and storing global alignment information of the texture. Implementing inpainting, utilizing the multi-layer texture UV map and using the flow UV map are included in processing the free viewpoint video content which further includes geometry processing. The system further comprises transmitting, rendering and displaying the free viewpoint video content including the object with temporally consistent texture. The system further comprises acquiring the free viewpoint video content using at most 10 video cameras. The system further comprises acquiring the free viewpoint video content using video cameras with at least 30 degrees of separation on every axis from other cameras.

DETAILED DESCRIPTION OF THE PREFERRED EMBODIMENT

Dense view 3D video capture utilizes many cameras (e.g., 40-100+) to capture content from many different angles. More specifically, the spacing between the cameras may be very small (e.g., less than 5 degrees) between each camera. In dense view 3D video capture, processing is relatively simple compared with sparse view 3D video capture, since in sparse view there are issues that arise that do not appear during dense view 3D video capture. For example, occlusion is much more of a concern when using sparse view 3D video capture.

Sparse view 3D video capture uses far fewer cameras to capture content from many different angles. For example, sparse view 3D video capture may use 10 or fewer cameras for the same space that dense view 3D video capture uses 100 cameras. Put another way, the spacing (on at least one or every axis) between the cameras may be 45 degrees or even 90 degrees.

UV mapping is a 3D modeling process of projecting a 2D image onto the surface of a 3D model for texture mapping. Since X, Y and Z are used to denote axes of a 3D object in model space, U and V are axes of the 2D texture.

A scalable texture data representation which enables spatio-temporal texture synthesis for occlusion by using a temporally consistent texture UV map, view-dependent texture mapping for seamless/specular color by using an additional multi-layer texture UV map, and view-dependent texture alignment for natural mapping by using an extra flow UV map, is described herein.

Regarding stacking layers, layers are able to be generated in a different way such as per object, per reflectivity or others. Moreover, due to the method's scalability, one or a few layers are able to be chosen based on the situation (e.g., bandwidth, processing power).

Figure 1:
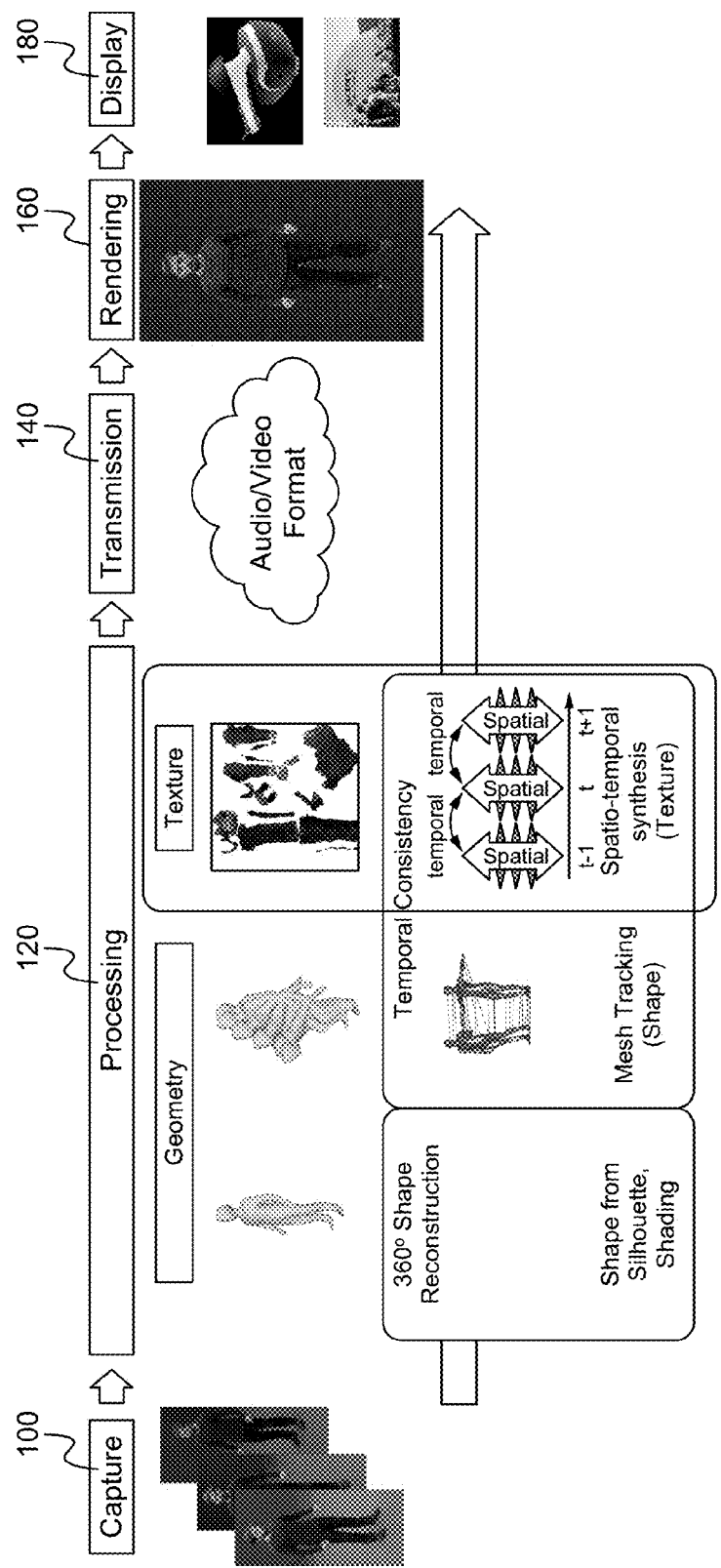
FIG. 1 illustrates a diagram of a method of multi-layer UV map-based texture rendering according to some embodiments.

FIG. 1 illustrates a diagram of a method of multi-layer texture UV map-based texture rendering according to some embodiments. In the step 100, content is captured. In the step 120, the captured content is processed. In the step 140, the processed content is transmitted. In the step 160, the transmitted content is rendered. In the step 180, the rendered content is displayed.

As described herein, in the step 100, the content is captured using sparse-view 3D video cameras. For example, multiple cameras capture 3D video from a plurality of different angles such as in front of, behind, to the left of and to the right of the object to capture.

In the step 120, the captured content is processed. Processing includes geometry processing and texture processing. Geometry processing includes reconstructing a 360 degree shape (e.g., using visual hull) and temporal consistency (e.g., mesh tracking). The 360 degree shape reconstruction is able to utilize multi-view stereo with 3D densification or any other type of shape generation such as using mesh templates, comparing and selecting a template based on the acquired content, and modifying the templates based on the shape of the acquired content using multiple views. The mesh tracking is able to include any type of mesh tracking such as probabilistic mesh tracking or temporally tracking the mesh in a non-rigid deformation or as described in U.S. Patent Application No. 15/653,363, titled, "ROBUST MESH TRACKING AND FUSION BY USING PART-BASED KEY-FRAMES AND PRIORI-MODEL," which is hereby incorporated by reference in its entirety for all purposes. Another example of a mesh tracking implementation is described in "High-Quality Streamable Free-Viewpoint Video to Collet, et al., Microsoft Corp," which teaches estimating a feasibility score of each frame being a keyframe, choosing a most promising non-tracked frame as a keyframe, and performing nonlinear registration to fit the keyframe meshes to neighboring frames which is repeated until every frame is associated with a keyframe. Mesh tracking is important for mesh compression which is able to be implemented by splitting a mesh sequence into keyframes and predictive frames, where the keyframe meshes include geometry and connectivity information, and the geometric information includes vertex positions and UV coordinates. Texture processing is able to utilize spatio-temporal synthesis such as UV map-based synthesis.

UV map-based synthesis is implemented as described herein by: performing inpainting in the UV map domain to address occlusion, using a multi-layer texture UV map and a weighting scheme to avoid noticeable texture seams, and utilizing a flow UV map for view-dependent alignment to prevent incorrect shapes.

In the step 140, the processed content is transmitted (e.g., streamed). Transmitting the processed content is able to include any type of 3D coding for compact data representation of geometry and texture. In some embodiments, the transmission of the processed content includes encoding and decoding the content from a first device to a second device.

In the step 160, the transmitted content is rendered. For example, a rendering device renders a FVV video using the processed shape information and the texture information.

In the step 180, the rendered FVV video is displayed (e.g., on a television or in a virtual reality headset).

In some embodiments, fewer or additional steps are implemented. In some embodiments, the order of the steps is modified.

In some embodiments, the steps described herein occur on a same device, and in some embodiments, the steps occur on separate devices (e.g., capture devices, a processing device, a transmission device, a rendering device and a display device). In another example, the capture devices include multiple 3D cameras, the processing device is a server or a computing device and the rendering/display device is a television.

Figure 2:
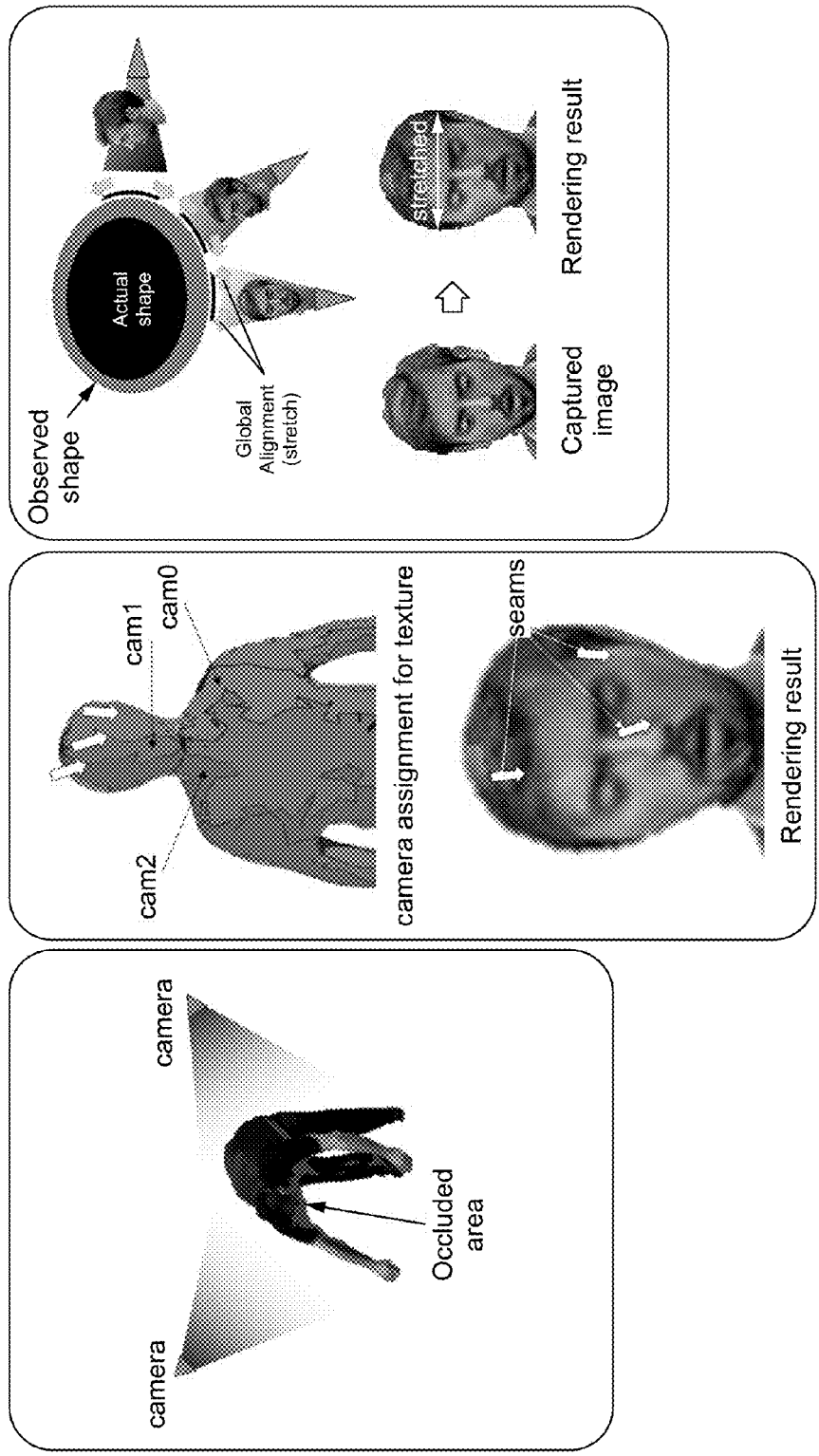
FIG. 2 illustrates images of the three issues solved by UV map-based synthesis according some embodiments.

FIG. 2 illustrates images of the three issues solved by UV map-based synthesis according some embodiments. UV map-based synthesis addresses occlusion, texture seams and an incorrect shape of an object in FVV content. Since the FVV content is captured using sparsely spaced cameras, the chances of occlusion (e.g., an aspect of an object which is blocked or is not visible) are greatly increased. Texture seams when stitching together multiple textures from different cameras are very visible and aesthetically displeasing. Additionally, the shape of an object may be incorrect due to a variety of errors, so that texture from different cameras need to be globally aligned to each other on the surface, otherwise they are displaced. However, even with the global alignment, unnaturally stretched texture is still observed instead.

To address the occlusion issue, inpainting (e.g., filling in areas which are not captured by any camera) is utilized.

Figure 3:
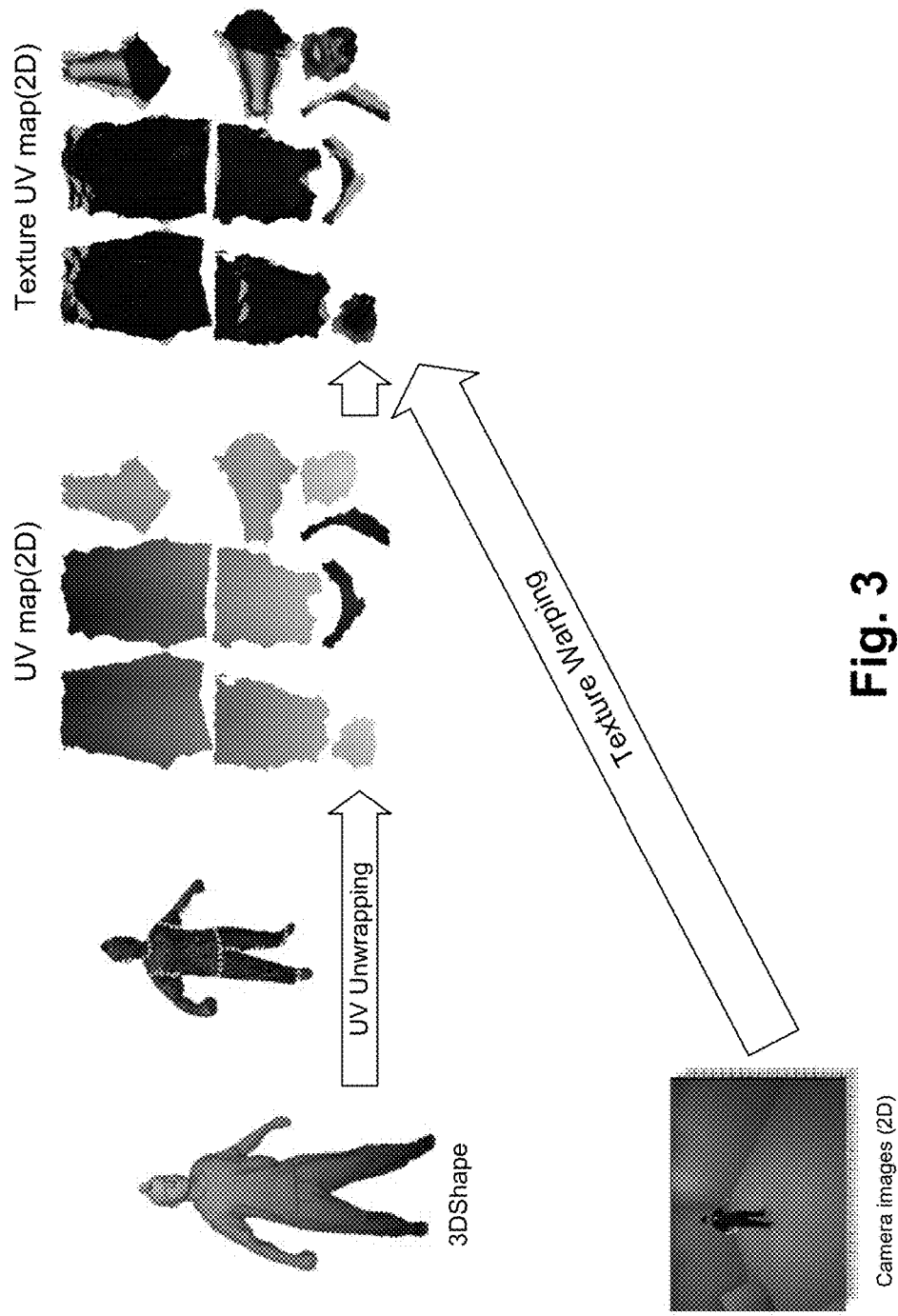
FIG. 3 illustrates a texture UV map according to some embodiments.

FIG. 3 illustrates a texture UV map according to some embodiments. The UV map is generated by unwrapping a 3D shape onto the 2D domain. An example of a UV unwrapper is UVAtlas by Microsoft. Based on these correspondences, then captured images are warped onto this generated UV map, which is called as texture UV map. A benefit of using texture UV map is that all textures are always accessible in 2D domain. That enables using any kind of conventional 2D inpainting technology.

Figure 4:
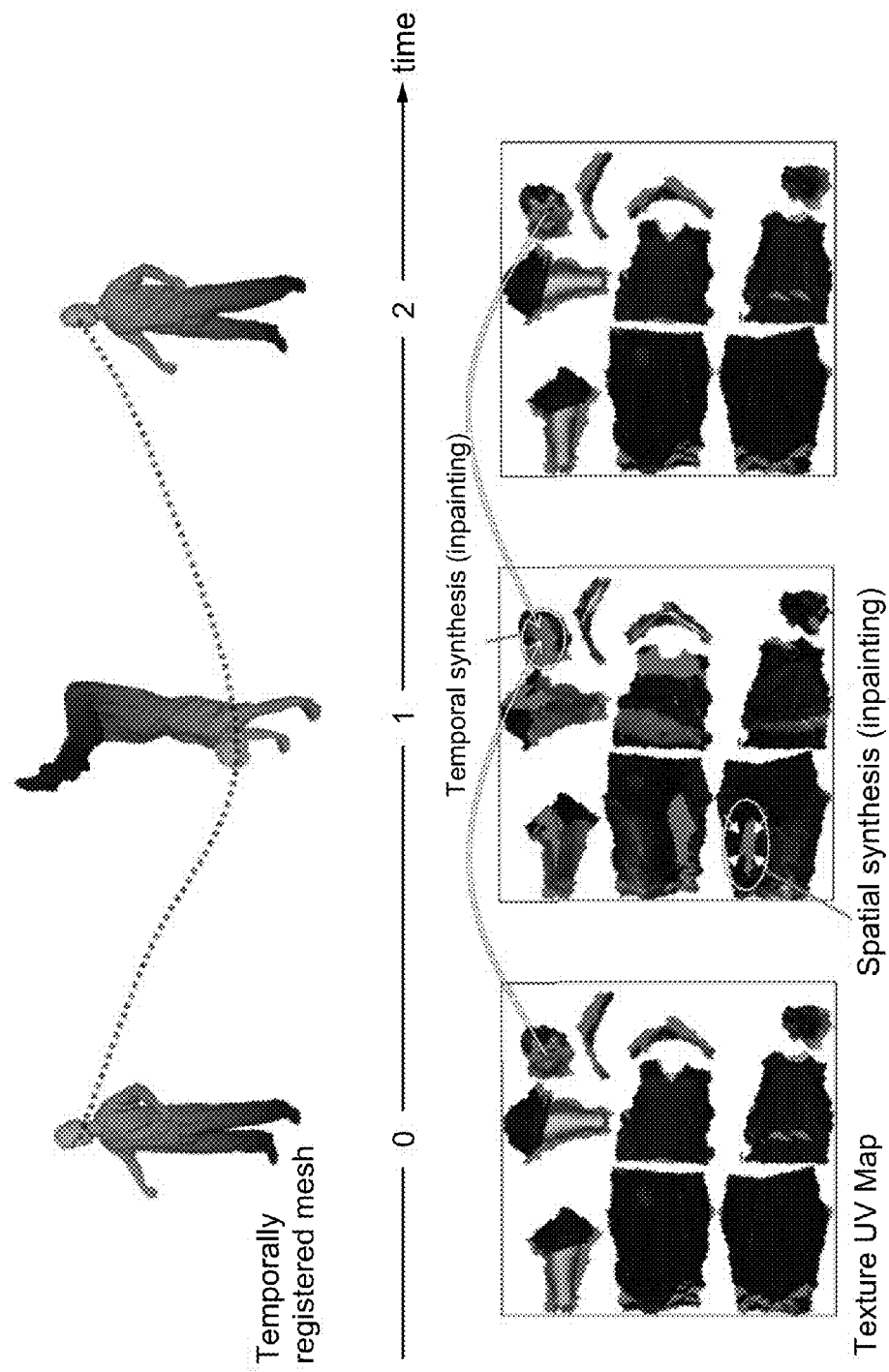
FIG. 4 illustrates a diagram of inpainting in the UV map domain according to some embodiments.

FIG. 4 illustrates a diagram of inpainting in the UV map domain according to some embodiments. On a texture UV map, occluded texture is able to be easily inpainted spatially by surrounding textures, which is also referred to as spatial synthesis. In addition, using a temporally registered mesh (e.g., a shape that moves along in time), temporal synthesis is possible as well because texture remains at the same UV position across time. Temporal synthesis is another phrase for inpainting using texture captured at an earlier time and later time to use for occluded texture. For example, a texture UV map acquired at time 0 includes the texture acquired when the person is standing, a texture UV map acquired at time 1 includes the texture acquired when the person is doing a hand stand, and a texture UV map acquired at time 2 includes the texture acquired when the person is standing again. Using spatial synthesis and temporal synthesis, texture from the texture UV map and/or the texture UV map are able to be used to inpaint (e.g., fill in) any occluded (missing) texture in the texture UV map.

Figure 5:
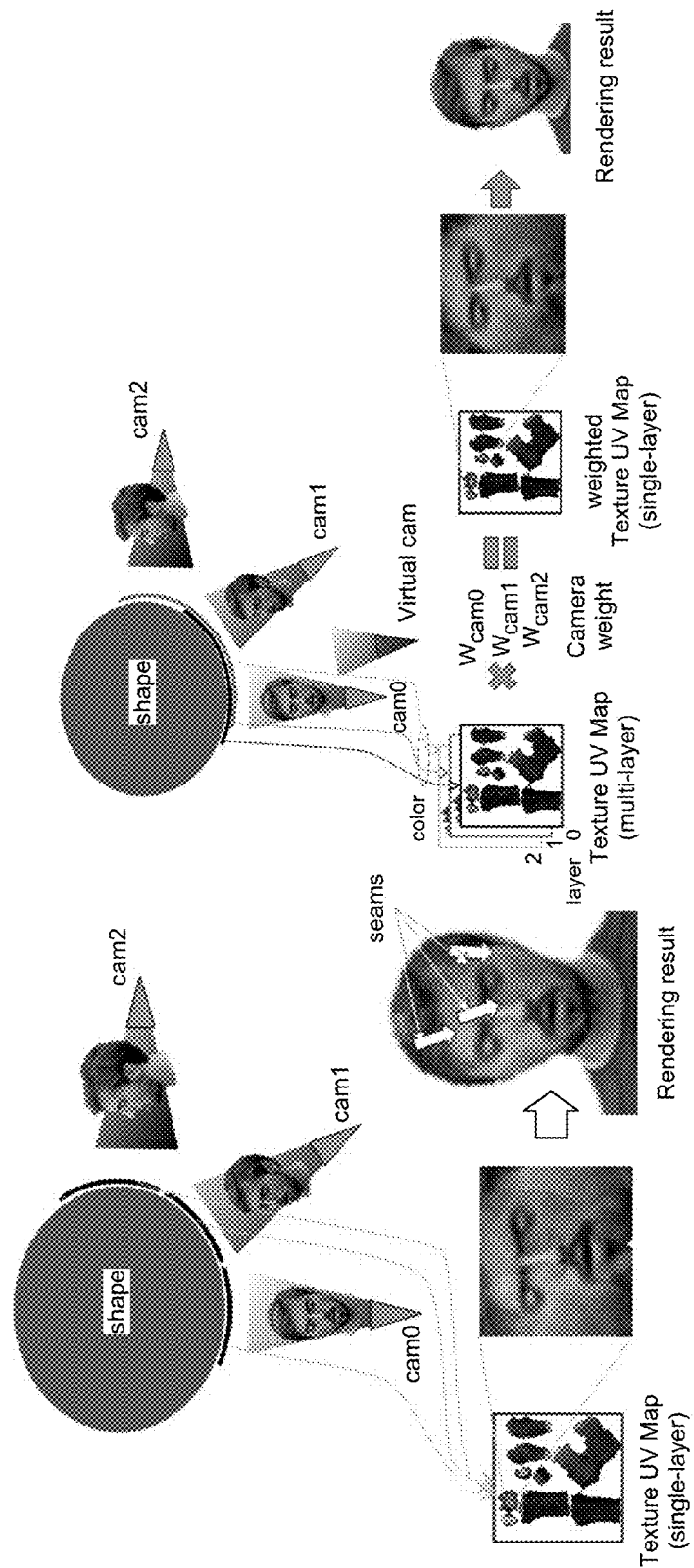
FIG. 5 illustrates a diagram of view independent texture mapping versus view dependent texture mapping (single-layer versus multi-layer UV maps for texture synthesis) according to some embodiments.

FIG. 5 illustrates a diagram of view independent texture mapping versus view dependent texture mapping (single-layer versus multi-layer UV maps for texture synthesis) according to some embodiments. Using a single layer UV map, the textures from each camera are stitched together to generate a complete face (or other object). However, as is shown, there are differences among each camera that affect the appearance (e.g., color) of each texture piece stitched together. As a result, the seams between each texture piece are obvious.

Using a multi-layer texture UV map, there are multiple layers (e.g., colors) from each camera, and by using a weighted sum of the multiple layers, the differences between the texture pieces are able to be minimized such that the texture seams are unnoticeable. The weighting of the cameras is able to depend on where a virtual camera for rendering is configured/positioned (=view dependent). For example, as shown, the virtual camera is positioned near camera 0, so camera 0's weight is greater than camera 1, and camera 1's weight is greater than camera 2, since camera 2 is the farthest camera. The virtual camera is able to be positioned anywhere. In some embodiments, a user controls where the virtual camera is positioned. For example, if the user chooses to view FVV content from a specific location, that is the position of the virtual camera. In some embodiments, the virtual camera position is determined automatically (e.g., by a system). For example, the computer system determines that showing the FVV content from the side of an object is best because it enables the viewer to see the object in its entirety, and the computer system shows the video from a side angle which is the position of the virtual camera. Regarding weighting, the weighting is able to be used in any manner. For example, the multi-layer texture UV map is multiplied by the different weights which provides a weighted sum of the texture which has the appearance of the object without obvious texture seams. Although one layer is assigned for each camera, any kind of layer assignment is also able to be used. For example, visibility-based layer assignment stores textures from Nth-best visible cameras to N-th layer, that means each layer includes textures from multiple cameras. Volino et al., "Optimal Representation of Multi-View Video," also describes multi-layer texture map video which uses a surface-based optical flow alignment between views to correct for errors in geometric reconstruction and camera calibration. The approach by Volino takes a set of camera views with a reconstructed and temporally aligned mesh sequence, where the mesh reconstruction is performed using multi-view reconstruction and surface alignment techniques.

Figure 6:
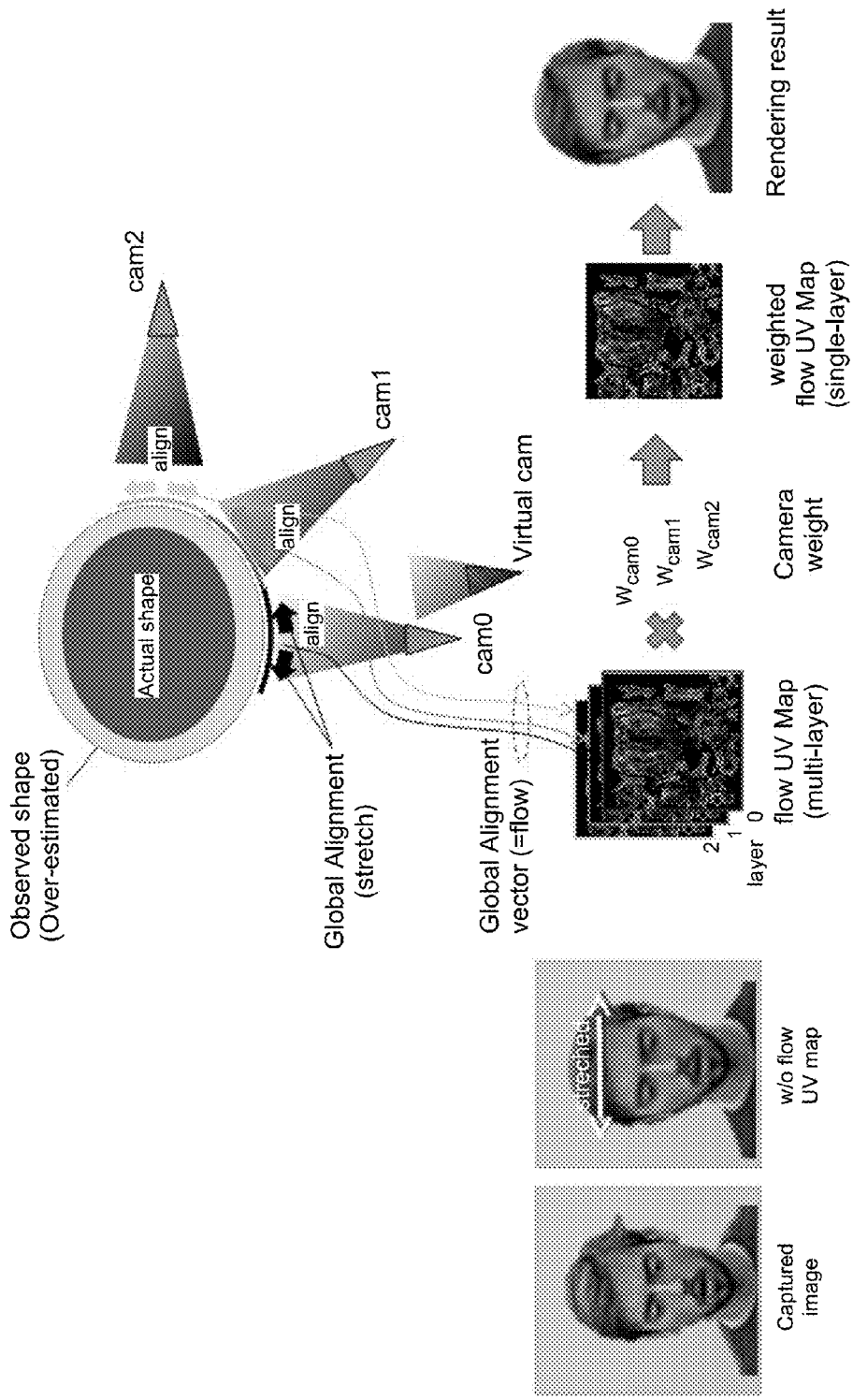
FIG. 6 illustrates a diagram of using view-dependent texture alignment to address an incorrect shape issue according to some embodiments.

FIG. 6 illustrates a diagram of using view-dependent texture alignment to address an incorrect shape issue according to some embodiments. By using a flow UV map, when placing the texture on the shape, the textures are aligned such that they cover the shape appropriately to minimize visibility of distortions. The flow UV map is utilized by storing global alignment information to the UV map domain when texture UV map is generated. The global alignment information indicates where each texture is to be positioned. In some embodiments, the global alignment information stores coordinates of each texture. In some embodiments, the global alignment information indicates which texture each texture is positioned next to. The global alignment information indicates how to stretch the texture back to the original position. The global alignment information is able to be determined in any manner such as analyzing captured texture information including coordinates/position information from each camera and storing that information in a UV map to generate a flow UV map which includes the texture information and the global coordinate/alignment information. Based on the virtual camera position, weights are able to be applied to the camera views, as the camera closer to the virtual camera has more weight (=view-dependent), and a weighted flow UV map is able to be used. The weighted flow UV map is optimized for the texture. For example, the weights are applied (e.g., multiplied) to the information stored in the flow UV map which generates a scaled, texture UV map which is able to be applied to a shape to make it look as if it is a properly shaped FVV object (e.g., the shape is still inaccurate, but scaled texture conceals the inaccuracies).

Figure 7:
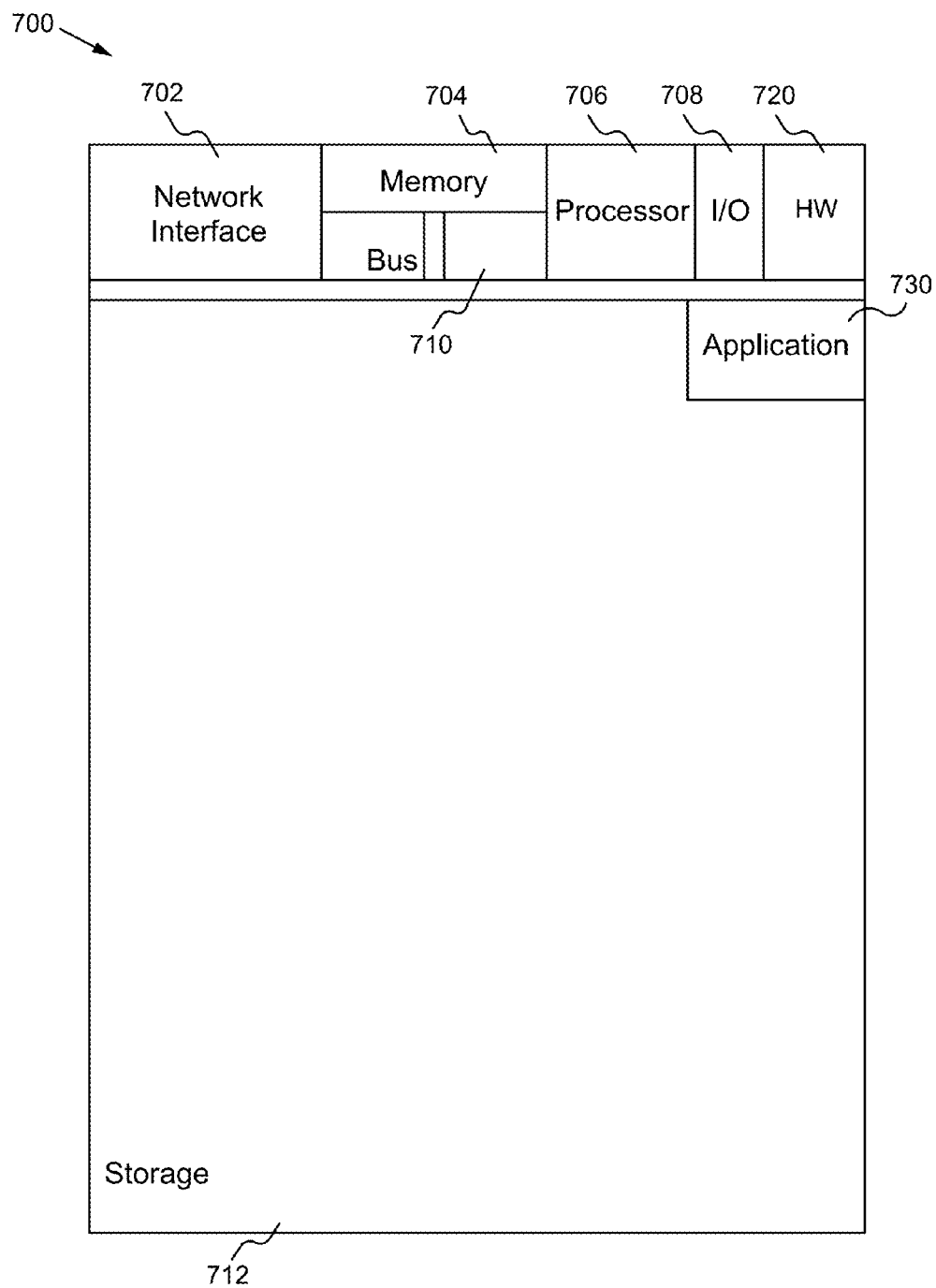
FIG. 7 illustrates a block diagram of an exemplary computing device configured to implement the UV map-based synthesis according to some embodiments.

FIG. 7 illustrates a block diagram of an exemplary computing device configured to implement the UV map-based synthesis according to some embodiments. The computing device 700 is able to be used to acquire, store, compute, process, communicate and/or display information such as images and videos (e.g., FVV). The computing device 700 is able to implement any of the UV map-based synthesis aspects such as capturing, processing, transmitting, rendering and/or displaying. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, High Definition disc/drive, ultra-HD drive, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, screen, printer, modem, touchscreen, button interface and other devices. UV map-based synthesis application(s) 730 used to implement the UV map-based synthesis are likely to be stored in the storage device 712 and memory 704 and processed as applications are typically processed. More or fewer components shown in FIG. 7 are able to be included in the computing device 700. In some embodiments, UV map-based synthesis hardware 720 is included. Although the computing device 700 in FIG. 7 includes applications 730 and hardware 720 for the UV map-based synthesis, the UV map-based synthesis is able to be implemented on a computing device in hardware, firmware, software or any combination thereof. For example, in some embodiments, the UV map-based synthesis applications 730 are programmed in a memory and executed using a processor. In another example, in some embodiments, the UV map-based synthesis hardware 720 is programmed hardware logic including gates specifically designed to implement the UV map-based synthesis.

In some embodiments, the UV map-based synthesis application(s) 730 include several applications and/or modules. In some embodiments, modules include one or more sub-modules as well. In some embodiments, fewer or additional modules are able to be included.

In some embodiments, the UV map-based synthesis hardware 720 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch) or any other suitable computing device.

Figure 8:
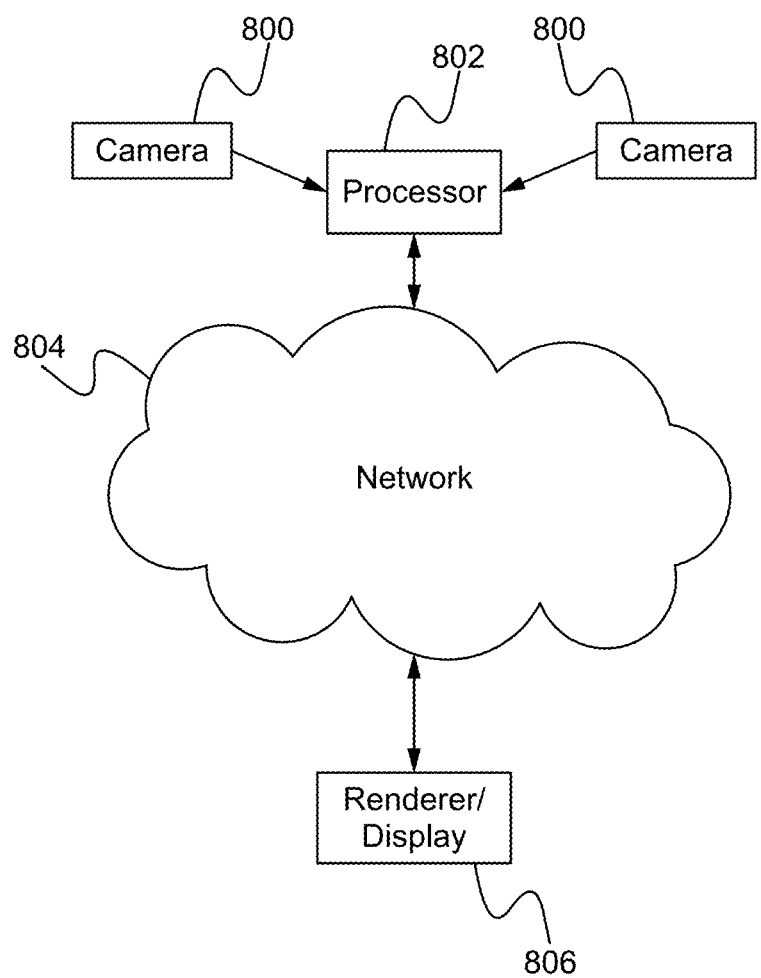
FIG. 8 illustrates a diagram of a network of devices according to some embodiments.

FIG. 8 illustrates a diagram of a network of devices according to some embodiments. A plurality of cameras 800 are utilized to acquire 3D/FVV video content. The video content is processed (including inpainting, utilizing a multi-layer texture UV map, using a flow UV map) at one or more processor devices 802. The processed content is transmitted/streamed through a network 804 (e.g., the Internet, a cellular network or any other network) to one or more renderer/display devices 806. In some embodiments, the content is transmitted to the one or more renderer/display devices 806 directly without a network. In some embodiments, the renderer device and the display device are separate devices. The one or more devices of the network of devices (e.g., processor device, renderer/display device) is configured to perform the UV map-based synthesis implementation described herein. The one or more processor devices 802 and the one or more renderer/display devices 806 are able to be any device such as servers, a personal computers, smart phones, televisions, gaming systems, virtual reality devices or any of the devices described herein or any combination of devices described herein. In some embodiments, the camera (s) 800 implement additional aspects of the UV map-based synthesis such as processing and/or rendering.

To utilize the UV map-based synthesis described herein, devices such as digital cameras/camcorders are used to acquire 3D/FVV content. The UV map-based synthesis is able to be implemented with user assistance or automatically without user involvement to efficiently and accurately process/apply the texture for the 3D/FVV content. Then, upon playback of the acquired content, a more accurate content is displayed (e.g., with fewer or no artifacts).

In operation, the UV map-based synthesis generates more accurate content, specifically temporally consistent texture, than previous implementations. Further, the UV map-based synthesis addresses three significant problems regarding texture: occlusion, texture seams and incorrect shapes Multi-Layer UV Map Based Texture Rendering for Free-Running FVV Applications 1. A method programmed in a memory of a device to render a texture on an object in a free viewpoint video content comprising:
    implementing inpainting in a UV map domain;
    utilizing a multi-layer texture UV map to combine texture segments; and
    using a flow UV map to apply texture to a shape to prevent an incorrect shape, wherein implementing inpainting, utilizing the multi-layer texture UV map and using the flow UV map produce a temporally consistent texture for the object.

2. The method of clause 1 wherein implementing inpainting in the UV map domain includes filling in any occluded aspects of the texture for the object using the texture captured at a different time.

3. The method of clause 1 wherein utilizing the multi-layer texture UV map includes employing a weighted sum to combine the texture segments.

4. The method of clause 1 wherein using the flow UV map includes generating and storing global alignment information of the texture.

5. The method of clause 1 wherein implementing inpainting, utilizing the multi-layer texture UV map and using the flow UV map are included in processing the free viewpoint video content which further includes geometry processing.

6. The method of clause 1 further comprising transmitting, rendering and displaying the free viewpoint video content including the object with temporally consistent texture.

7. The method of clause 1 further comprising acquiring the free viewpoint video content using at most 10 video cameras.

8. The method of clause 1 further comprising acquiring the free viewpoint video content using video cameras with at least 30 degrees of separation on every axis from other cameras.

9. An apparatus comprising:
    a non-transitory memory for storing an application, the application for:
      implementing inpainting in a UV map domain;
      utilizing a multi-layer texture UV map to combine texture segments; and
      using a flow UV map to apply texture to a shape to prevent an incorrect shape, wherein implementing inpainting, utilizing the multi-layer texture UV map and using the flow UV map produce a temporally consistent texture for the object; and
a processor coupled to the memory, the processor configured for processing the application.

10. The apparatus of clause 9 wherein implementing inpainting in the UV map domain includes filling in any occluded aspects of the texture for the object using the texture captured at a different time.

11. The apparatus of clause 9 wherein utilizing the multi-layer texture UV map includes employing a weighted sum to combine the texture segments.

12. The apparatus of clause 9 wherein using the flow UV map includes generating and storing global alignment information of the texture.

13. The apparatus of clause 9 wherein implementing inpainting, utilizing the multi-layer texture UV map and using the flow UV map are included in processing the free viewpoint video content which further includes geometry processing.

14. The apparatus of clause 9 further comprising transmitting, rendering and displaying the free viewpoint video content including the object with temporally consistent texture.

15. The apparatus of clause 9 further comprising acquiring the free viewpoint video content using at most 10 video cameras.

16. The apparatus of clause 9 further comprising acquiring the free viewpoint video content using video cameras with at least 30 degrees of separation on every axis from other cameras.

17. A system comprising:
a plurality of camera devices each configured for capturing free viewpoint video content;
a first computing device configured for:
implementing inpainting in a UV map domain;
utilizing a multi-layer texture UV map to combine texture segments; and
using a flow UV map to apply texture to a shape to prevent an incorrect shape, wherein implementing inpainting, utilizing the multi-layer texture UV map and using the flow UV map produce a temporally consistent texture for the object in the free viewpoint video content; and
a second computing device configured for:
displaying the free viewpoint video content on the second computing device.

18. The system of clause 17 wherein implementing inpainting in the UV map domain includes filling in any occluded aspects of the texture for the object using the texture captured at a different time.

19. The system of clause 17 wherein utilizing the multi-layer texture UV map includes employing a weighted sum to combine the texture segments.

20. The system of clause 17 wherein using the flow UV map includes generating and storing global alignment information of the texture.

21. The system of clause 17 wherein implementing inpainting, utilizing the multi-layer texture UV map and using the flow UV map are included in processing the free viewpoint video content which further includes geometry processing.

22. The system of clause 17 further comprising transmitting, rendering and displaying the free viewpoint video content including the object with temporally consistent texture.

23. The system of clause 17 further comprising acquiring the free viewpoint video content using at most 10 video cameras.

24. The system of clause 17 further comprising acquiring the free viewpoint video content using video cameras with at least 30 degrees of separation on every axis from other cameras.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a memory of a device to render a texture on an object in a free viewpoint video content comprising:
implementing inpainting in a UV map domain;
utilizing a multi-layer texture UV map to combine texture segments; and
using a flow UV map to apply texture to a shape to prevent an incorrect shape, wherein implementing inpainting, utilizing the multi-layer texture UV map and using the flow UV map produce a temporally consistent texture for the object, wherein implementing inpainting in the UV map domain includes filling in any occluded aspects of the texture for the object using the texture captured at a different time.

2. The method of claim 1 wherein utilizing the multi-layer texture UV map includes employing a weighted sum to combine the texture segments.

3. The method of claim 1 wherein using the flow UV map includes generating and storing global alignment information of the texture.

4. The method of claim 1 wherein implementing inpainting, utilizing the multi-layer texture UV map and using the flow UV map are included in processing the free viewpoint video content which further includes geometry processing.

5. The method of claim 1 further comprising transmitting, rendering and displaying the free viewpoint video content including the object with temporally consistent texture.

6. The method of claim 1 further comprising acquiring the free viewpoint video content using at most 10 video cameras.

7. The method of claim 1 further comprising acquiring the free viewpoint video content using video cameras with at least 30 degrees of separation on every axis from other cameras.

8. An apparatus comprising:
a non-transitory memory for storing an application, the application for:
implementing inpainting in a UV map domain;
utilizing a multi-layer texture UV map to combine texture segments; and
using a flow UV map to apply texture to a shape to prevent an incorrect shape, wherein implementing inpainting, utilizing the multi-layer texture UV map and using the flow UV map produce a temporally consistent texture for the object, wherein implementing inpainting in the UV map domain includes filling in any occluded aspects of the texture for the object using the texture captured at a different time; and
a processor coupled to the memory, the processor configured for processing the application.

9. The apparatus of claim 8 wherein utilizing the multi-layer texture UV map includes employing a weighted sum to combine the texture segments.

10. The apparatus of claim 8 wherein using the flow UV map includes generating and storing global alignment information of the texture.

11. The apparatus of claim 8 wherein implementing inpainting, utilizing the multi-layer texture UV map and using the flow UV map are included in processing the free viewpoint video content which further includes geometry processing.

12. The apparatus of claim 8 further comprising transmitting, rendering and displaying the free viewpoint video content including the object with temporally consistent texture.

13. The apparatus of claim 8 further comprising acquiring the free viewpoint video content using at most 10 video cameras.

14. The apparatus of claim 8 further comprising acquiring the free viewpoint video content using video cameras with at least 30 degrees of separation on every axis from other cameras.

15. A system comprising:
a plurality of camera devices each configured for capturing free viewpoint video content;
a first computing device configured for:
implementing inpainting in a UV map domain;
utilizing a multi-layer texture UV map to combine texture segments; and
using a flow UV map to apply texture to a shape to prevent an incorrect shape, wherein implementing inpainting, utilizing the multi-layer texture UV map and using the flow UV map produce a temporally consistent texture for the object in the free viewpoint video content, wherein implementing inpainting in the UV map domain includes filling in any occluded aspects of the texture for the object using the texture captured at a different time; and
a second computing device configured for:
displaying the free viewpoint video content on the second computing device.

16. The system of claim 15 wherein utilizing the multi-layer texture UV map includes employing a weighted sum to combine the texture segments.

17. The system of claim 15 wherein using the flow UV map includes generating and storing global alignment information of the texture.

18. The system of claim 15 wherein implementing inpainting, utilizing the multi-layer texture UV map and using the flow UV map are included in processing the free viewpoint video content which further includes geometry processing.

19. The system of claim 15 further comprising transmitting, rendering and displaying the free viewpoint video content including the object with temporally consistent texture.

20. The system of claim 15 further comprising acquiring the free viewpoint video content using at most 10 video cameras.

21. The system of claim 15 further comprising acquiring the free viewpoint video content using video cameras with at least 30 degrees of separation on every axis from other cameras.

* * * * *